Figure 1:
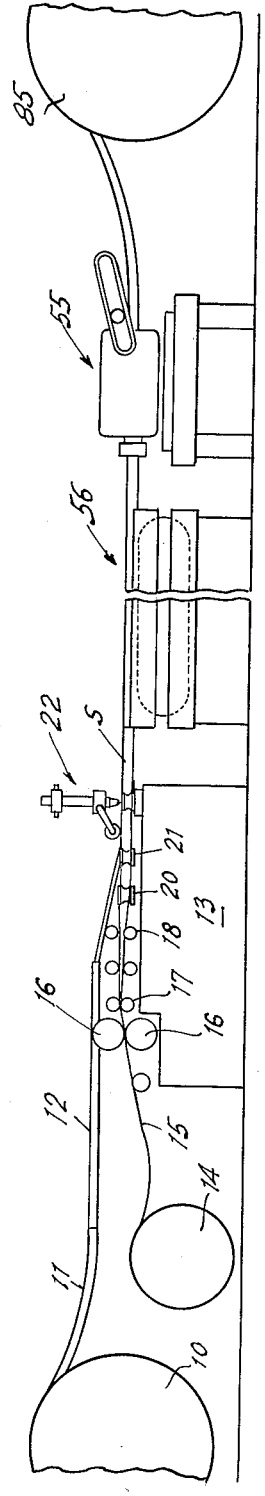

Feb. 27, 1962      G. LEHNERT      3,023,300

METHOD AND APPARATUS FOR FORMING CABLE SHEATH

Filed Aug. 10, 1959      6 Sheets-Sheet 1

INVENTOR.
Guenther Lehnert
BY
*Philip E. Hilbert*
ATTORNEY

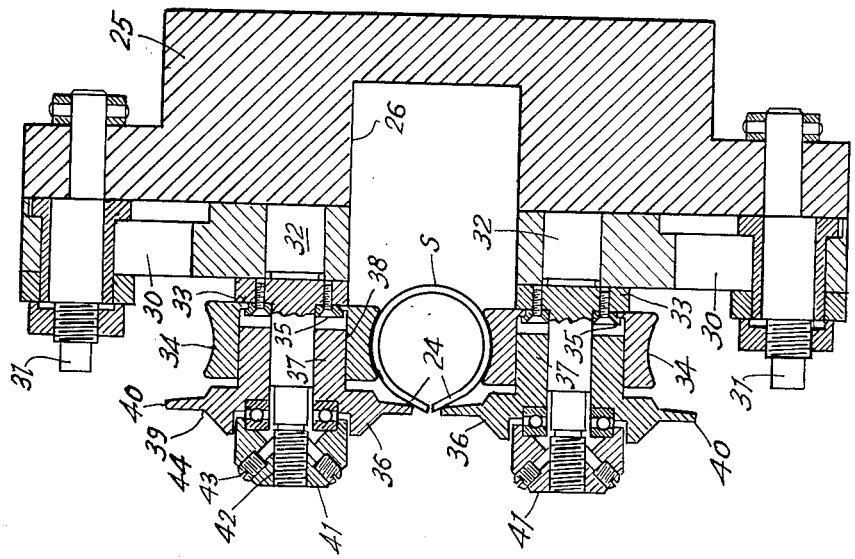
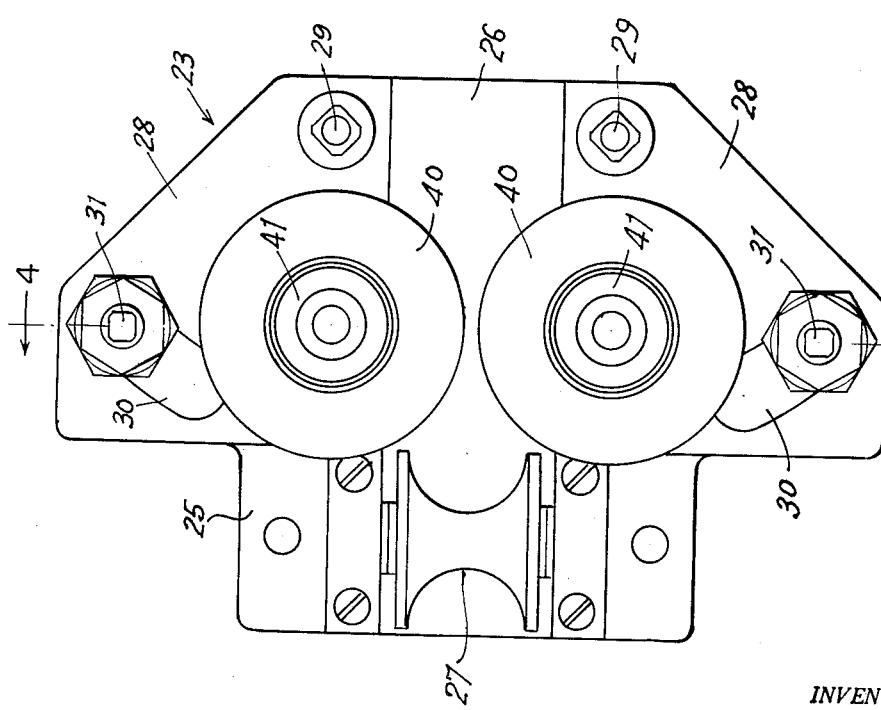

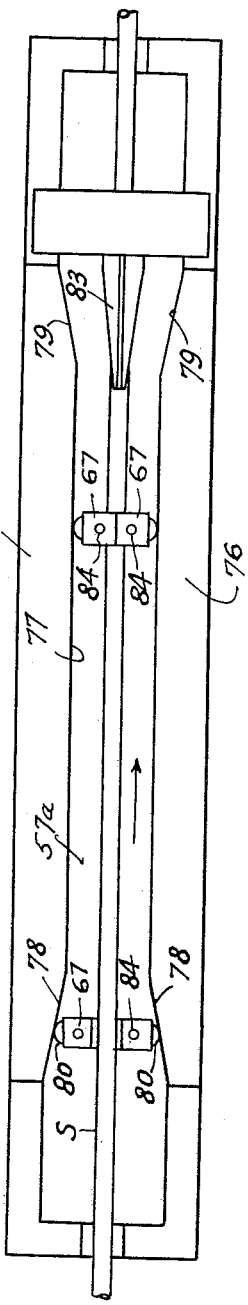
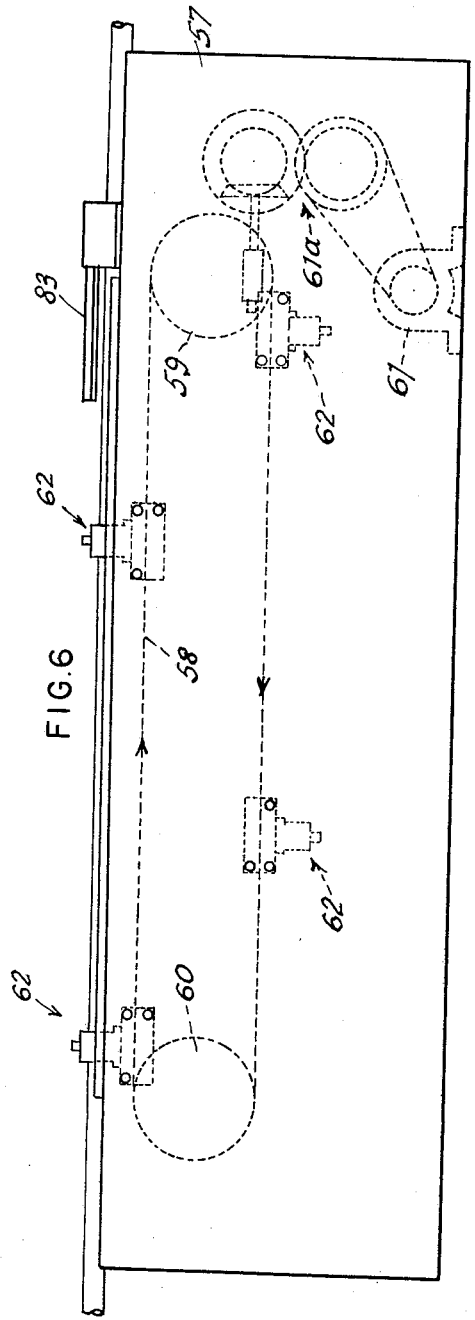

Feb. 27, 1962  G. LEHNERT  3,023,300
METHOD AND APPARATUS FOR FORMING CABLE SHEATH
Filed Aug. 10, 1959  6 Sheets-Sheet 5

INVENTOR.
Guenther Lehnert
BY
ATTORNEY

Feb. 27, 1962 G. LEHNERT 3,023,300
METHOD AND APPARATUS FOR FORMING CABLE SHEATH
Filed Aug. 10, 1959 6 Sheets-Sheet 6
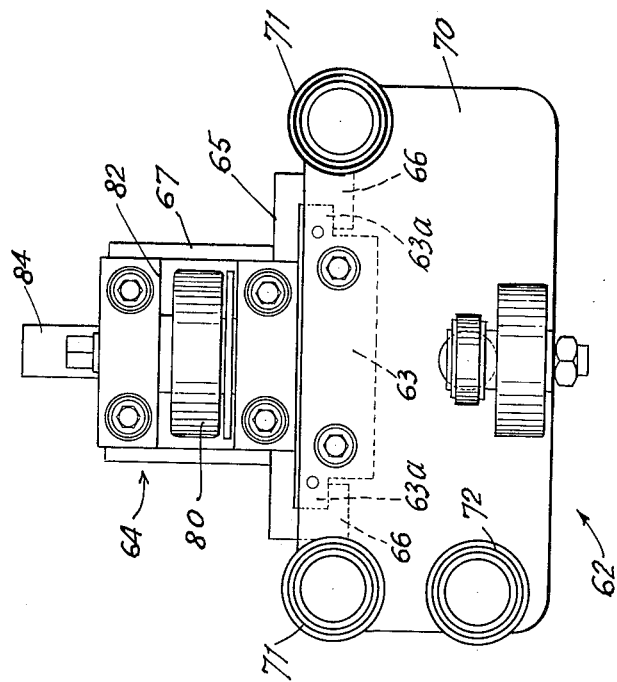
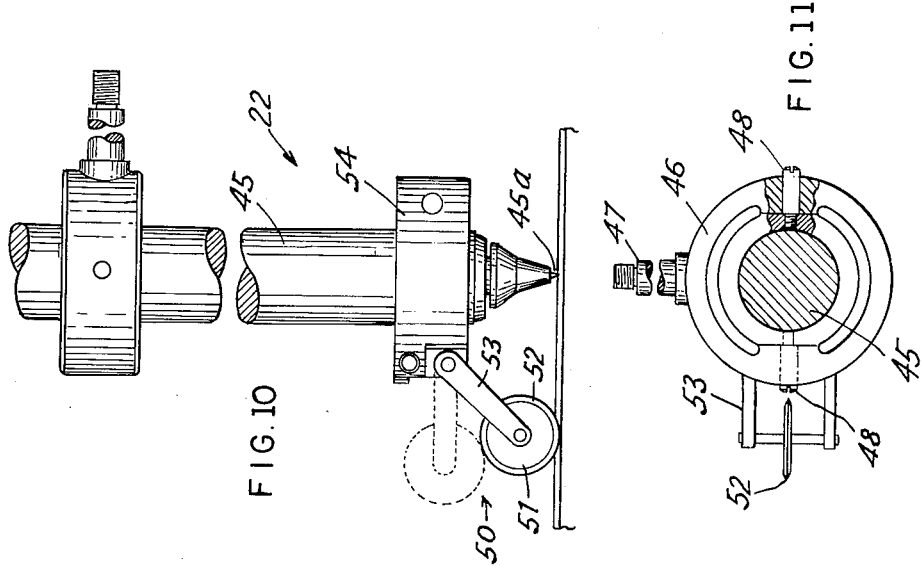
INVENTOR.
Guenther Lehnert
BY
ATTORNEY United States Patent Office 3,023,300
Patented Feb. 27, 1962

3,023,300
METHOD AND APPARATUS FOR FORMING CABLE SHEATH
Guenther Lehnert, Hannover, Germany, assignor to Hackethal Draht- und Kabel Werke A.G., Hannover, Germany, a corporation of Germany
Filed Aug. 10, 1959, Ser. No. 832,665
7 Claims. (Cl. 219—60)

This invention relates to methods and apparatus for forming sheaths for various forms of electrical cables. More particularly, the invention concerns the production of cable sheaths from thin metal strips with a continuous, longitudinal welded joint.

Electrical cables have been provided with metal sheaths of high mechanical strength, utilizing metals such as aluminum, copper or steel. Conventionally, such sheaths are formed from the metal in strip form, which is formed about the cable, in tubular form, the opposed longitudinal edges of the sheath being welded or soldered together.

This invention is particularly concerned with methods and apparatus for producing high strength welded seams in thin walled metal cable sheaths, wherein the seam is of uniform high quality throughout its length and does not vary in quality from that of the sheath wall portions adjacent the seam. Thus, the seam is free of porosity, hermetically tight and preferably, having a mechanical strength equal to that of the sheath wall.

An object of this invention is to provide methods and apparatus for welding a butt joint in thin metal strip formed into a continuously moving tube; wherein the welding operation takes place at a very high rate of speed and the metal strip may have a thickness as small as 0.2 mm.

A further object of this invention is to produce cable sheathing from thin copper strip having a thickness of the order of about 0.5 mm., using arc welding equipment with an inert gas atmosphere; the welded joint being produced at a very high rate of speed, yet forming a pore free weld of high mechanical strength. Thus, copper cable sheath may be formed at rates of more than 1 meter per minute; the welded joint being devoid of pores or brittleness and providing a good hermetic seal.

Another object of this invention is to provide improved procedures for converting a continuously moving metal strip into tubular sheath form, wherein the opposed tube edges are brought into precision relation to each other immediately in advance of the welding station, thereby insuring precise registry of the tube joint and the welding electrode.

Still another object of this invention is to provide an improved procedure for welding a butt joint in a continuously moving metal tube, wherein the welding electrode may be moved in synchronized relation to any transverse movements of the tube edges in passing to the welding station, thus insuring a precision, uniform weld of the abutting tube edges.

Yet another object of this invention is to provide improved procedures for forming cable sheath which is transversely corrugated to provide flexibility in the completed sheath; the procedure including the passing of the freshly welded tubing to a corrugating station and including provisions for gripping the tubing between the welding and corrugating stations to prevent torsional displacement of the tubing as an incident to the corrugating operation, thereby avoiding stresses or displacement of the joint edges at the welding station which would result in a bad weld.

Other objects of this invention will in part be obvious and in part hereinafter pointed out.

Figure 2:
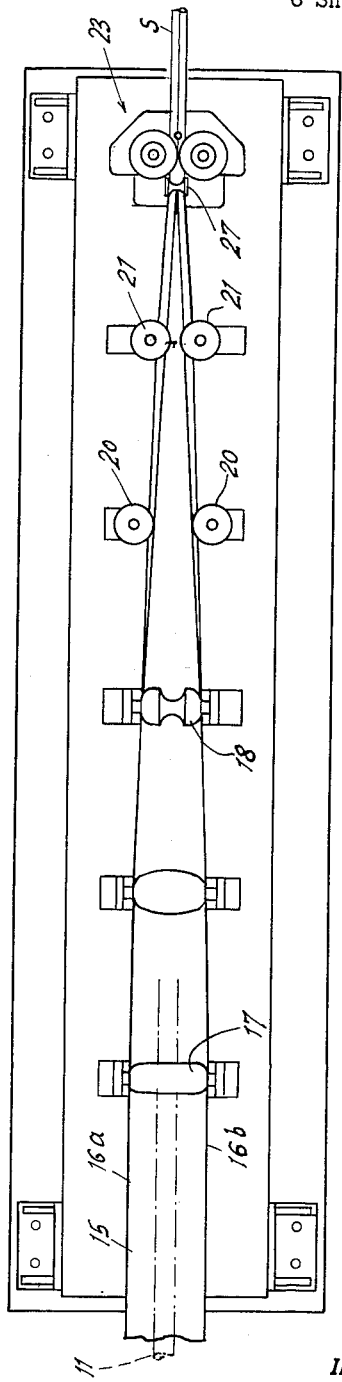
Figure 7:
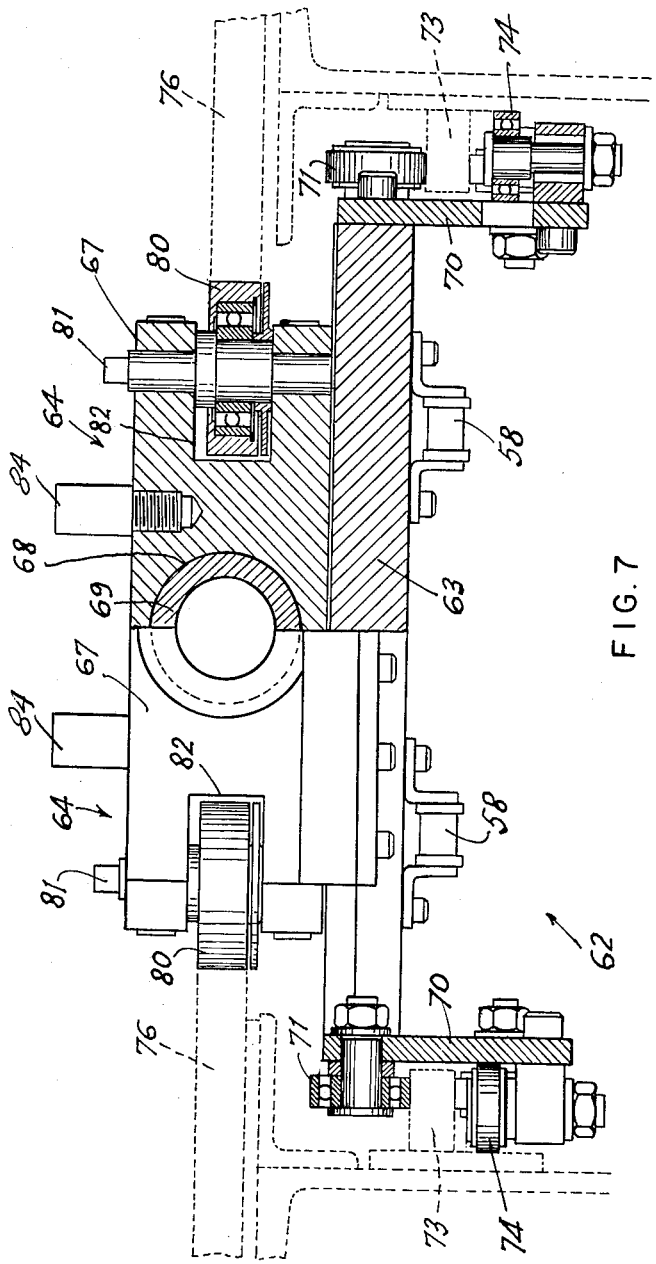
Figure 8:
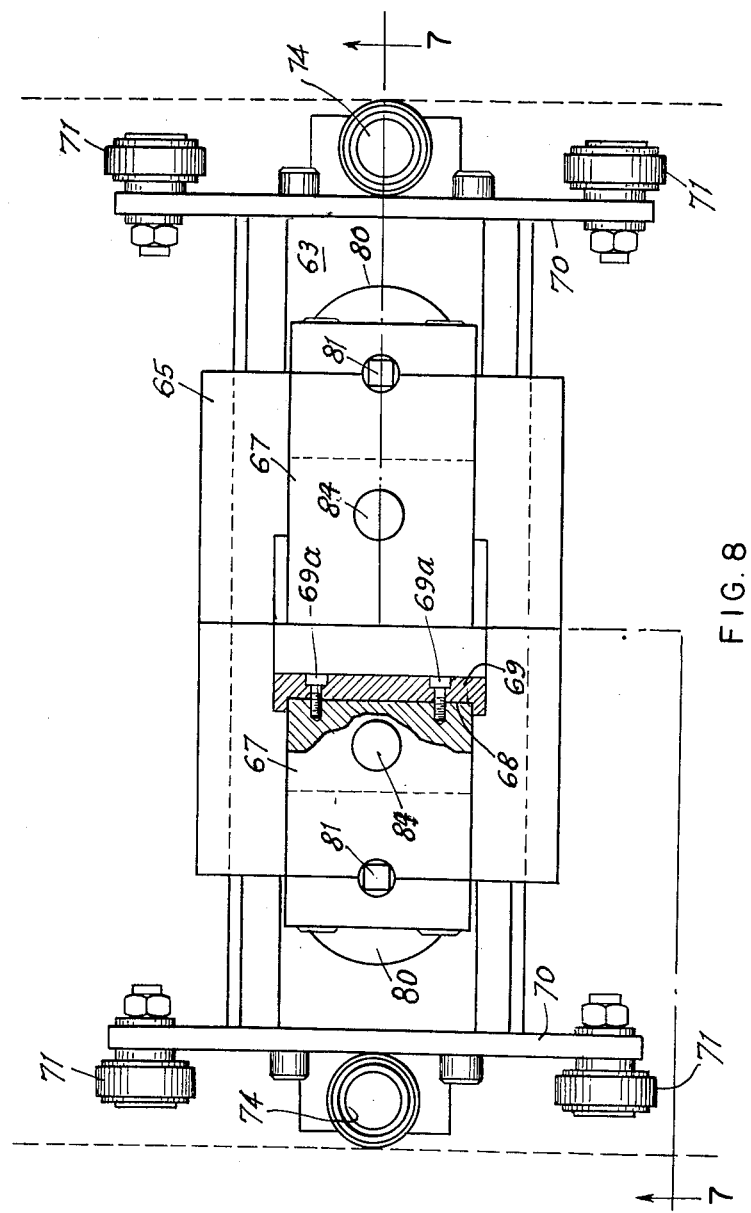

In the drawings,

FIG. 1 is a diagrammatic representation of the process and apparatus embodying the invention;
FIG. 2 is a top plan view of the initial portion of the tube forming operation;
FIG. 3 is a top plan view of the roller assembly for bringing the tube edges into properly opposed relation;
FIG. 4 is a transverse sectional view taken on the line 4—4 of FIG. 3;
FIG. 5 is a top plan view of the draw-off unit for the freshly welded tubing;
FIG. 6 is a side elevational view thereof;
FIG. 7 is a transverse sectional view of a portion thereof;
FIG. 8 is a top plan view of a portion thereof, with parts in section;
FIG. 9 is a side eleavtional view of an element thereof;
FIG. 10 is a side elevational view of the welding device and its associated guide means; and
FIG. 11 is a top plan view thereof, with parts in section.

Essentially, the instant invention is directed to apparatus and procedures for forming cable sheath from thin metal strip of aluminum, steel or copper; wherein a longitudinal butt joint is formed in the tubular sheath by welding, the joint being non-porous and providing a hermetic seal. Such cable is formed at a very high rate of speed, yet having a joint which in addition to being uniformly non-porous, also has high mechanical strength.

Furthermore, the invention relates to a correlation of means for corrugating the freshly formed cable sheath, with means for gripping the sheath as it moves from the welding station to the corrugating means, so as to prevent torsional stresses arising at the corrugating means from being transmitted to the welding station and thus avoid adverse effects on the freshly welded joint. Such arrangement not only insures a precision welded joint but also permits the cable sheath to be formed at very high rates of speed.

Thus, as shown in FIG. 1, the apparatus embodying the invention comprises an arrangement of a reel 10 of electric cable core 11, which is to be sheathed in accordance with the invention. The core 11 is fed by suitable guide means 12 to a forming table 13; to which is also fed from a roll of metal strip 14, a continuous strip of steel, aluminum or copper 15. The metal strip 15 is fed through a pair of trimming rolls 16 on table 13 to cut said strip to precise width and to provide freshly cut lateral strip edges 16a, 16b.

The trimmed strip 15 then passes through successive pairs of forming rollers 17, 18 rotating on horizontal axes, which progressively convert strip 15 into substantially tubular form, aided by forming rollers 20, 21 rotating about vertical or inclined axes.

Thus, strip edges 16a, 16b are gradually brought into closely spaced relation, as indicated in FIG. 2. It is understood that cable core 11 is being introduced into the sheath as the same is being formed on table 13. At the distal end of table 13 there is provided a welding station generally indicated at 22, in association with a final forming assembly, generally indicated at 23.

As the sheath S approaches the forming assembly 23, it is understood that the lateral marginal portions of the formed strip 15 are in flat, upwardly convergent form, as indicated at 24, in FIG. 4. The forming assembly 23 is adapted to press marginal strip portions 24 downwardly to leave strip edges 16a, 16b at a precise, close spacing immediately prior to reaching the welding station 22.

Thus, as shown in FIGS. 3, 4, forming assembly 23 comprises a base member 25 secured to table 13, said member being formed with a longitudinal channel 26 traversed by a horizontally disposed supporting and guide roller 27. On the upper surface of member 25 are mounted a pair of flat mounting plates 28, pivoted on member 25 as at 29 for movement toward and away from each other. Plates 28 are formed with arcuate slots 30 for receiving bolts 31 for locking the same in selected positions thereof.

On each of the mounting plates 28 is vertically journalled a shaft 32 having an annular flange 33 on an intermediate portion thereof and bearing on said plate. A roller 34 is rotatably mounted on each of shaft flanges 33 and held against axial movement by annular collars 35. Rollers 34 have a concave periphery bearing against the side portions of sheath S to guide the movement thereof and to restrain the same against lateral outward deflection.

On each of shafts 32 is slidably and rotatably mounted a forming member generally indicated at 36. Member 36 comprises an elongated hub sleeve portion 37 received on shaft 32 and disposed within an axial bore 38 of roller 34. At the upper end of sleeve portion 37 is an annular disc portion 39 having a tapered peripheral edge portion 40 which is adapted to overlie and engage marginal edge portions 24 of sheath S.

The axial position of disc portion 39 may be adjusted on shaft 32 by means of a cap member 41 having a threaded bore and screwed on the upper threaded portion 42 of shaft 32. Set screws 43 on cap member 41 lock said cap member in selected positions on shaft portion 42. A bearing assembly 44 on the underside of cap member 41 connects forming member 36 to said cap member. Thus, the precise spacing between approaching strip edges 16a, 16b may be adjusted by appropriate location of disc edges 40. Also, mounting plates 28 may be moved to adjust the spacing between rollers 34 in accordance with the precise O.D. of the sheath S.

The welding station 22 has a vertically disposed welding device 45 provided with the usual welding tip electrode 45a at its lower end. Such device may be of the inert gas shielded type, using argon or similar gases for shielding. The welding device 45 is mounted for movement transversely of the path of movement of sheath S. The mounting, as shown in FIG. 11, includes a mounting ring 46 having a lateral rod extension 47 for positioning the same on base means, not shown. The upper portion of device 45 is swingably mounted on ring 46 by pivot screws 48.

Means is provided for sensing any deviation of strip edges 16a, 16b from a normal path of movement, as they approach the welding electrode 45a, and for adjusting the position of said welding electrode accordingly. To this end, sensing means 50, as shown in FIGS. 10, 11, comprises a disc 51 arranged to have its tapered peripheral edge 52 received between strip edges 16a, 16b. Disc 51 is mounted on a bifurcated member 53 which is pivotally attached on a ring 54 secured to the lower end of device 45.

Thus, any shift in the path of movement of strip edges 16a, 16b will be transmitted to device 45 by way of disc 51; thus keeping electrode 45a in synchronized relation to said strip edges 16a, 16b, to insure a uniform weld-ment of said edges. It has been found that the electrode 45a should be closely positioned relative to the point of weld, with a maximum distance of about 1.0 mm., and preferably about 0.6 mm. Optical scanning devices, not shown, may be used to magnify the weld area, and thereby indicate when adjustment of the electrode 45a may be necessary.

The freshly welded sheath S passes from welding station 22 to a corrugating device generally indicated at 55 wherein said sheath is corrugated transversely by means known in the art, to produce a substantial degree of flexibility in the sheath. However, the operation of device 55 may introduce torsional stresses in sheath S as it is being corrugated, such stresses being transmitted back to the welding station 22 to adversely affect the welded joint being formed at said station.

Accordingly, means is provided for smoothly gripping the freshly welded sheath S while the same is moving from welding station 22 to the corrugating device 55. To this end, gripping means generally indicated at 56, is shown in FIGS. 5-9.

Device 56 comprises an elongated frame 57 having a longitudinally extending, centrally located opening therethrough. Within frame 57 are arranged a pair of parallel, endless sprocket chains 58 entrained about sprocket wheels 59, 60 at opposite ends of frame 57. Chains 58 are driven through a motor 61 and a gear train 61a connecting said motor to sprocket wheel 59. Mounted on said chains 58 are a series of longitudinally spaced, similar gripper assemblies 62, which move longitudinally of frame 57 within opening 57a thereof.

As shown in FIGS. 7-9, each assembly 62 comprises essentially, a base plate 63 extending transversely of chains 58 and secured thereto, and including parallel, transversely extending flanged edge portions 63a. Slidably mounted on base plate 63 is a pair of opposed gripper members 64 arranged for movement toward and away from each other.

Thus, each member 64 includes a base 65 having channeled edge portions 66 for engaging base flange portions 63a. Upstanding from base 65 is a block 67 formed on the inner edge thereof with a semi-circular cutout 68 for receiving therein a semi-circular sleeve 69 secured in place by screws 69a. It will be apparent that with gripper members 64 in opposed, close relation, sleeves 69 provide an axial, circular opening for passing sheath S and uniformly gripping the same about the circumference thereof.

Each of the base plates 63 is provided on its outer edge with a vertically disposed apron plate 70 which carry a pair of longitudinally spaced upper guide rollers 71 and a single lower guide roller 72. Frame 57 is provided with guide rails 73 extending longitudinally therewith guide rollers 71, 72 engaging the same when of assemblies 62 are travelling on the upper reach of chains 58. Furthermore, a single guide roller 74 is mounted on each apron plate 70 for rotation about a vertical axis and engageable with fixed guide plates 75 on frame 57 on either side of opening 57a therein.

Means is provided for moving gripper members 64 towards and away from each other at appropriate points in the forward travel thereof, while said members are on the upper reach of chains 58. To this end, frame 57 is provided with horizontal, opposed plates 76 for defining opening 57a therein. Plates 76 include parallel edge portions 77 extending for a major portion of the length of said plates but terminating short of the opposite ends thereof.

Plates 76 further include divergent edge portions 78 at the proximal end thereof, and similar divergent edge portions 79 at the distal end thereof. Plate edges 77, 78 and 79 provide cam tracks for actuating gripper blocks 64. To this end, each of the gripper blocks 64 is provided on its outer edge with a rotatable cam follower 80 journalled on a vertical shaft 81 passing through a horizontal recess 82 extending inwardly from the outer edge of block 67 to receive said cam follower 80 whose peripheral portions project outwardly of said block edges.

It will be apparent from a consideration of FIGS. 5, 6, that as each assembly 62 is moved by chains 58 to assume an upright position within frame opening 57a, cam followers 80 will engage cam track portions 78 to progressively move said gripper members 64 toward each other to effect a gripping action on the sheath S moving through frame opening 57a. The sheath S will be tightly engaged and will move with assemblies 62 as they pass between cam track portions 77. Such gripping action will be maintained for the length of cam track portions 77, thus preventing any torsional stresses incident to the corrugating of the sheath at device 55, from being transmitted to the welding station 22 where such stresses would impair the freshly welded butt joint formed at said station.

At the distal end of frame 57, a horizontally disposed, wedge shaped member 83 fixed to the frame and located slightly above the level of gripper members 64, is engaged by upstanding abutment members 84 on blocks 67, to cause outward displacement of the gripper members 64, limited by cam track portions 79, thereby releasing sheath S as the same moves on to corrugating device 55. The displaced gripper members 64 continue their movement on chains 58 about sprocket wheels 59 and then about sprocket wheels 60 where the cycle of engagement and disengagement with moving sheath S is repeated.

The finished sheath S in seamed and corrugated form, encasing cable core 11, is wound up on reel 85. It is understood that the operation of corrugating means 55 is correlated to the rate of movement of sheath S.

It has been found that the foregoing methods and apparatus are particularly applicable to the production of cable sheath at a very high rate of speed, where the metal strip is aluminum, steel or copper. When copper strip is used, it is preferred that the copper have an oxygen content of less than .001% and a phosphorus content of less than .007%.

As various changes might be made in the embodiments of the invention herein shown, without departing from the spirit thereof, it is understood that all matter described or shown is illustrative and not limiting except as set forth in the appended claims.

Having thus disclosed my invention, I claim as new and desire to protect by Letters Patent:

1. The process for continuously forming a tubular sheath from a metal strip comprising continuously feeding said strip in a longitudinal path, continuously forming the moving strip into substantially tubular form and bringing the opposite strip edges toward each other, pressing the opposed marginal edge portions of said tube downwardly toward the axis thereof to locate said strip edges at a predetermined spacing, immediately thereafter welding said strip edges together to form a continuous butt joint, corrugating the welded tubular sheath transversely thereof at a point beyond the welding point, and gripping the welded tubular sheath during the movement thereof between the welding and corrugating points to prevent torsional stresses originating at said corrugating point from being transmitted to the welding point.

2. The process of forming metal tubular sheathing from a metal strip, comprising continuously forming said strip into tubular form, feeding the tubing to a welding station for forming a continuous, butt joint between the opposed strip edges, feeding the welded tubing to a corrugating station for transversely corrugating said tubing, and gripping said welded tubing during the movement thereof between said welding and corrugating stations to prevent the transmission of stresses originating at said corrugating station, to said welding station through said tubing.

3. Apparatus for forming a transversely corrugated tubular metal sheath, comprising means for continuously forming a moving metal strip into tubular form, means for continuously welding the adjacent strip edges of the formed sheath, means longitudinally spaced from said welding means for transversely corrugating the tubular sheath, and gripping means located between said welding means and said corrugating means for gripping the moving tubular sheath, said gripping means comprising longitudinally spaced pairs of gripper members respectively disposed on opposite sides of the moving tubular sheath and arranged for engagement and disengagement with said sheath at predetermined points in the travel of said sheath, means for moving said pairs of gripper members longitudinally in synchronized relation to the movement of said sheath, means for moving each pair of gripper members into engaging relation with said sheath as said pair of gripper members reaches a point in its travel adjacent said welding means, and means for moving each pair of gripper members to a disengaged position relative to said sheath at a point in its travel adjacent said corrugating means.

4. Apparatus as in claim 3 wherein said gripping means comprises a frame, a pair of laterally spaced endless chains arranged for longitudinal movement on said frame, means for moving said chains, each of said pairs of gripper members comprising a support member extending transversely of said chains and secured thereto, means for mounting said gripper members on said support member for slidable movement toward and away from each other, cooperating means on said frame and said gripper members for moving said gripper members toward each other at the proximal end of said frame, cooperating means on said frame and said gripper members for displacing said gripper members at the distal end of said frame, and means on the intermediate portion of said frame for maintaining said gripper members in gripping relation to said moving sheath between the proximal and distal points of said frame.

5. The process of forming tubular sheathing from a metal strip comprising forming said strip into tubular form with the strip edges in substantially abutting relation, welding said strip edges to form a continuous butt joint, transversely corrugating the tubular sheath, engaging said sheath immediately after the welding operation to grip said sheath, gripping said sheath as it moves toward the corrugating station, and releasing said sheath immediately before said corrugating station.

6. The process of forming metal tubular sheathing from a metal strip, comprising continuously forming said strip into tubular form and bringing the longitudinal edge portions thereof adjacent each other, feeding the tubing to a welding station, continuously welding said strip edge portions at said welding station to form a longitudinal joint, feeding the welded tubing to a corrugating station, continuously transversely corrugating said tubing at said corrugating station, and gripping said welded tubing during the movement thereof between said welding and corrugating stations to prevent the transmission of stresses originating at said corrugating station to said welding station through said tubing.

7. Apparatus for forming transversely corrugated tubular metal sheath, comprising means for continuously forming a moving metal strip into tubular form, means for continuously welding the adjacent strip edge portions to form a longitudinal joint, means longitudinally spaced from said welding means for transversely corrugating the tubular sheath, and gripping means located between said welding means and said corrugating means for gripping the moving tubular sheath, said gripping means comprising longitudinally moving gripping members arranged for movement to engage and disengage said moving tubular sheath, means for moving said gripping members into engaging relation with said moving tubular sheath as said moving tubular sheath leaves said welding means, and means for disengaging said gripping members from said moving tubular sheath as said moving sheath approaches said corrugating means.

References Cited in the file of this patent

UNITED STATES PATENTS

| | | |
|---|---|---|
| 1,093,010 | Ries | Apr. 14, 1914 |
| 1,288,866 | Friel | Dec. 24, 1918 |
| 1,407,001 | Schroder | Feb. 21, 1922 |
| 2,001,757 | Yoder | May 21, 1935 |
| 2,029,044 | Westlinning | Jan. 28, 1936 |
| 2,670,423 | Darner et al. | Feb. 23, 1954 |

Notice of Adverse Decision in Interference

In Interference No. 95,154 involving Patent No. 3,023,300, G. Lehnert, METHOD AND APPARATUS FOR FORMING CABLE SHEATH, final judgment adverse to the patentee was rendered Mar. 30, 1966, as to claim 2.

[*Official Gazette May 17, 1966.*]